United States Patent [19]
Karlsson

[11] Patent Number: 4,632,503
[45] Date of Patent: Dec. 30, 1986

[54] OPTICAL SCANNING DEVICE

[75] Inventor: Lars Karlsson, Täby, Sweden

[73] Assignee: Pharos AB, Lidingo, Sweden

[21] Appl. No.: 724,447

[22] Filed: Apr. 18, 1985

[30] Foreign Application Priority Data

Apr. 26, 1984 [SE] Sweden .................. 8402294

[51] Int. Cl.$^4$ ............................. G02B 26/10
[52] U.S. Cl. ........................................ 350/6.8
[58] Field of Search ............ 350/6.4, 6.5, 6.6, 6.7, 350/6.8, 6.9

[56] References Cited

U.S. PATENT DOCUMENTS 3,973,826  8/1976  Lobb .................................... 350/6.8
4,030,806  6/1977  Goshima et al. ...................... 350/6.8
4,478,482 10/1984  Koester .............................. 350/6.6

FOREIGN PATENT DOCUMENTS 440055  12/1935  United Kingdom .
1281773  7/1972  United Kingdom .
1419940 12/1975  United Kingdom .
2119539 11/1983  United Kingdom .

Primary Examiner—John K. Corbin
Assistant Examiner—Loha Ben
Attorney, Agent, or Firm—Pollock, Vande Sande & Priddy

[57] ABSTRACT

In an optical scanning device in which the active scanning means comprises a rotating polygon provided with a plurality of reflecting facets, the so-called optical invariant $$E = \phi \cdot \alpha \sim \frac{\text{element/line}}{\text{NETD}}$$

wherein $\phi$ is the aperture of the scanning device, $\alpha$ is the field angle of the scan, the NETD is the so-called Noise Equivalent Difference Temperature, is increased by passing the beam path against the polygon so as to be reflected therefrom a multiple of times, and therein with substantially complete tracking of the facets while substantially filling the same completely over the full extension of the facets, with the exception of that facet located nearest the beam detector. This is effected with the aid of stationary beam-deflecting optical means which cause the mutual reproductions between facets with reflection of substantially full extension in the rotary direction of the polygon to take place against diametrically opposed facets at a magnification of approximately −1.

5 Claims, 6 Drawing Figures

OPTICAL SCANNING DEVICE

INDUSTRIAL FIELD OF INVENTION

The present invention relates to an optical scanning device for effecting an optical scan over an area in at least one dimension, comprising a rotatable drum having a plurality of reflective facets uniformly disposed around the periphery thereof; a light-beam detector or a light-beam source placed at the end of the beam path within the scanning device; stationary optical elements possessing beam deflecting properties placed to pass and re-pass the beam path against the drum such that the extension of the reflection onto a facet on the drum lying nearest the detector or the beam source, is small in relation to the extension of the facet.

PROBLEMS TO BE SOLVED BY THE INVENTION

A good quality factor for an optical scanning device, e.g. a device for line scanning, is the optical invariant $E = \phi \cdot \alpha$, wherein $\phi$ is the aperture of the scanning device, i.e. the cross-section of the beam located at the input of the device and passed through the system, and $\alpha$ is the scan field angle. Expressed more simply, it is possible in the case, for example, of an infra-red scanning device having a given invariant E to replace thermal sensitivity with geometric resolution and vice versa, i.e. the following equation applies:

$$E \sim \frac{\text{element/line}}{\text{NETD}}$$

wherein NETD is the so-called Noise Equivalent Temperature Difference, which is a measurement of the sensitivity of the system.

This means that in an optical scanning system of given optical invariant and functioning for infra-red light, it is necessary to compromise between image resolution and sensitivity. An increase in the optical invariant affords a greater possibility of improving both these properties. Consequently, efforts are made to improve the optical invariant.

For example, if line scanning is effected with the aid of a rotating drum provided with reflective facets around the periphery thereof, such as to form a reflective polygon, it can be shown that solely with reflection against the drum, which is the most common case, the following relationship applies:

$$E \approx \frac{4 \pi^2 D}{N^2} \eta(1 - \eta)$$

wherein D is the distance between two mutually opposite planar sides of the polygon, i.e. the width across the flats, N is the number of facets, $\eta$ is the scan efficiency, which is dependent upon the ratio between the propagation of the beam over the facets and the size of the facets. If the scan is to be made at a high speed, it is necessary to rotate the drum at extremely high speeds, or the polygon must be given many sides or facets. If a polygon is to exhibit many facets, so as to provide a high optical invariant E, then it must have a large diameter. This is particularly true when the scanning efficiency is high (i.e. close to 1), since in this case each facet is large in relation to the diameter of the reflected beam.

PRIOR ART

The Swedish Patent Application No. 8201306-1, having the same applicant as the present application, describes an optical scanning device which produces a more effective scan and in which the active line scanning means comprises a rotatable drum provided with reflective facets, hereinafter referred to as a mirror polygon. A common feature of the embodiments described in the aforesaid patent application is that when effecting a line scan, the beam path is reflected twice against the same rotating mirror polygon. At the instance of the one reflection the beam diameter is relatively small. The efficiency of the scanning device is determined there. This reflection contributes only moderately to the actual scanning of a line, whereas at the instance of the second reflection the beam fills the facets and accompanies the same during a line sweep. This affords the greater contribution to the scan. It is possible to obtain with a mirror polygon in this way a relatively large optical invariant E, despite the fact that the polygon has many facets and narrow width across the flats. At best, the optical invariant is $$E \approx 4 \pi^2 \frac{D}{N^2} \eta(2 - \eta)$$

MEANS OF SOLUTION OF THE PROBLEMS

A still further improvement in the optical invariant E is obtained with a device according to the invention having the characteristic features that the stationary optical elements are arranged to pass the beam path for reflection against the polygon at least three times, to permit the beam path for each reflection against the polygon in addition to the reflection located nearest the detector or the beam source to follow the movement of the polygon substantially faithfully and in the rotational direction of the polygon to have a substantially complete extension over each facet against which a reflection takes place, and to permit the mutual reproduction between facets with reflection of substantially complete extension to take place against diametrically opposed facets at a magnification of approximately −1.

According to a feature of the invention the polygon has two rows of reflecting facets, of which the first row includes convex curved facets and the second row includes planar facets, wherewith the reflection located nearest the detector or the beam source is arranged to take place against a facet in the first row and the remaining reflections against mutually opposite facets in the second row.

According to another feature of the invention the polygon has one single row of facets, which are planar.

According to still another feature of the invention the optical elements between those reflections against the polygon which faithfully follow the polygon in its rotational movement, include a curved field mirror and a concave mirror. Also those optical elements between that reflection against the polygon occurring nearest the detector and the next following reflection against the polygon may include a curved field mirror and a concave mirror; and all reflections against the polygon occur against alternate opposing facets on the polygon.

BRIEF DESCRIPTION OF THE FIGURES

The invention will now be described in more detail with reference to the accompanying drawings, in which.

FUNCTION OF THE INVENTION

As before indicated, the object of the present invention is to increase further the optical invariant E for given values of D, N and $\eta$. This is achieved by causing the beam to reflect more than twice from an active scanning means in the form of a rotating mirror polygon, in a manner such that the beam rays fill a facet and accompany or track the same in its movement with the polygon. Naturally, it is not possible to track a facet arbitrarily, and can in fact only be achieved when observing certain pre-determined rules, which are given below.

When observing these rules the optical invariant obtains the formula $$E \approx 4\pi^2 \frac{D}{N^2} \eta(k - \eta)$$

wherein k is the number of reflections against the facets of the polygon.

Figure 1:
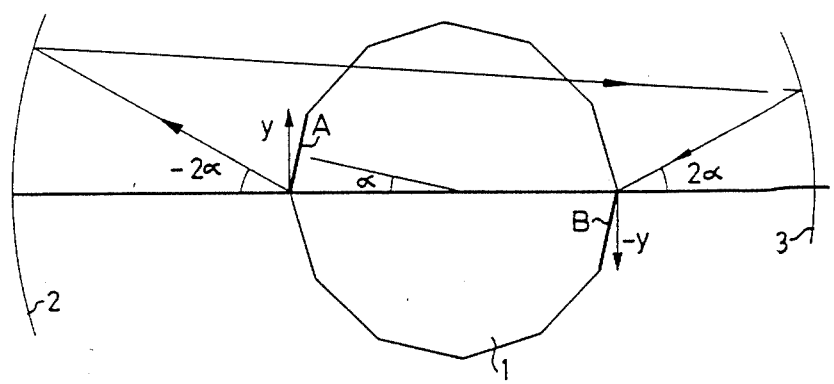
FIG. 1 illustrates the principle by which an additional facet tracking sequence is achieved with an externally reflecting polygon.

FIG. 1 illustrates the manner in which each additional facet tracking sequence is achieved with an externally reflecting rotary polygon. The beam path is prefixed so that the beam accompanies the movement of the polygon and fills the facet A. The manner in which this is achieved will be described hereinafter with reference to FIGS. 3 to 5. The facet A is reproduced on or in the proximity of the diametrically opposed facet B at a magnification approaching $-1$, with the aid of optical components placed in the beam path, such as the illustrated two curved mirrors 2 and 3. It should be noted in this respect that the actual beam path passing through the scanning device does not have its respective scanning spots on the facets. The beam accompanies or tracks this process of reproducing the facet A on or in the proximity of the facet B with a magnification of $-1$ and also fills the facet B, therewith providing a further, high contribution to the optical invariant E.

Figure 2:
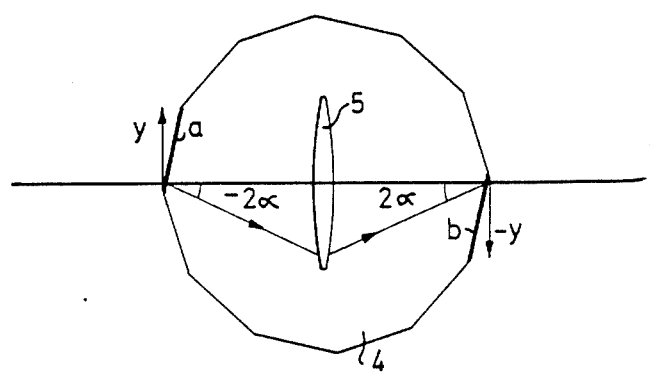
FIG. 2 illustrates the principle by which an additional facet tracking sequence is achieved with an internally reflecting polygon.

FIG. 2 illustrates the principle by which an additional facet tracking sequence is achieved with an internally reflecting polygon 4. The optical components effective in reproducing the facet A on the facet B with a magnification of $-1$ are represented here by a single lens 5.

WORKING EXAMPLES

Figure 3:
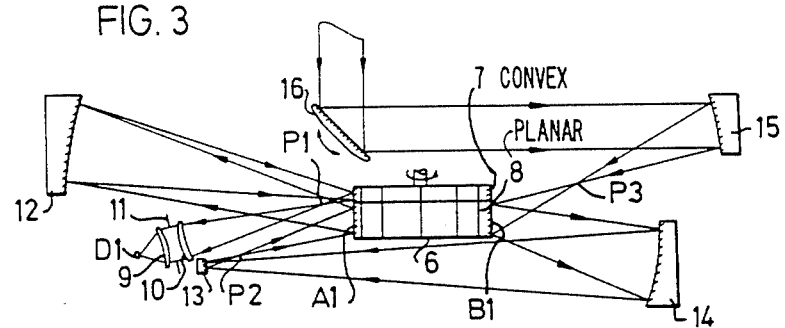
FIG. 3 is a sideview, partly in section, of a first embodiment of a device according to the invention.
Figure 4:
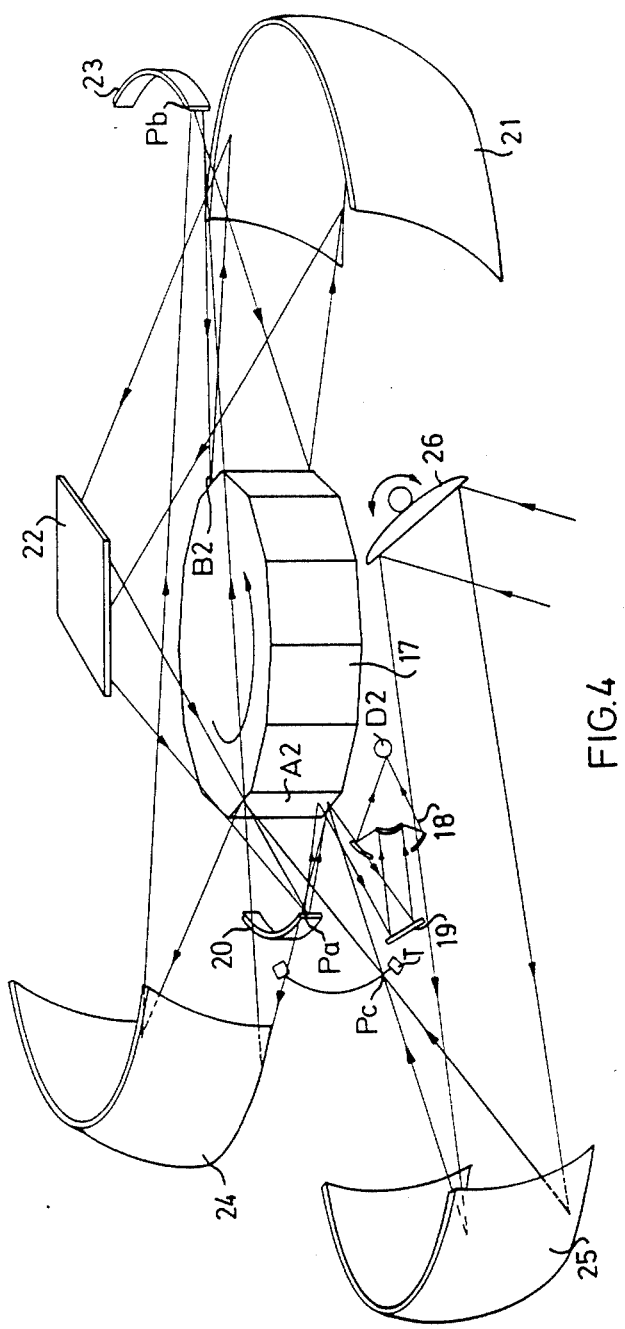
FIG. 4 is a perspective view of a second embodiment of a device according to the invention.

FIGS. 3 and 4 illustrate two different embodiments with external reflection, in which a rotating polygon reflects a total of three times, of which two include a facet tracking sequence.

The polygon 6 of the FIG. 3 embodiment has two parallel rows of facets 7 and 8. The facets in the upper row 7 are convex and may be either cylindrical or spherical. Thus, each facet in the row 7 will function as an active optical beam-deflecting element. In order to enable the scanning devices illustrated in the Figures to be more easily understood, the devices will be described with the detector as a starting point, even though the beam path actually passes in the opposite direction.

In the embodiment illustrated in FIG. 3, the detector D1 is reproduced on a spot P1 close to a facet in the row 7 by means of a relay optic comprising two lenses 9 and 10 and a diaphragm 11. The beam path is reflected by the facet, which functions as a field mirror. A concave mirror 12, which may be substantially spherical or toroidal in shape, returns the beam to the polygon 6 onto a facet A1 in the lower row 8 in FIG. 3. The facet A1 is suitably placed immediately beneath that facet in the upper row 7 against which the first reflection takes place. Subsequent to being reflected against the facet A1 in the row 8, the beam is focussed onto the spot P2. The mirror 12, the polygon 6 and the location of the spot P2 are all so dimensioned that upon reflection against the facet A1, the beam practically fills said facet, at least in the direction of rotation of the polygon. During the course of one scan the spot P2 moves through an arcuate curve in space. Located on or near this arcuate curve is a concave mirror 13, which is suitably of cylindrical or spherical configuration. The mirror 13 functions as a field mirror and directs the beam onto a further concave mirror 14, which may be substantially of spherical or toroidal configuration. The mirror 14 refocusses the beam onto a point P3 subsequent to reflection against a facet B1 in the lower facet row 8, this facet lying opposite the facet A1. Dimensioning of the mirrors 13 and 14 in relation to the polygon is such that the facet A1 is reproduced on the facet B1 with a magnification of $-1$.

A concave mirror 15 focusses the beam onto the object whose infra-red radiation is to be reproduced. If the object is remotely located, the beam path downstream of the mirror 15 will be practically collimated. A scanning mirror 16 is located in or close to the pupil of the beam path during a line scan. The scanning mirror 16 deflects the beam path vertically, so as to obtain a vertical scan.

In the embodiment illustrated in FIG. 4 the rotating polygon 17 has only one row of facets, which in this case are planar. In the FIG. 4 embodiment the beam path from the detector D2 passes through another type of relay optic 18, which is of the Cassegrain-type and thus comprises purely reflecting components. This type of relay optic can be used as an alternative to the relay optic 9-11 in FIG. 3 in all embodiments.

A planar mirror 19 deflects the beam path onto a facet A2, where it is reflected and focussed onto the spot Pa. A concave mirror 20 operative as a field mirror is placed close to the arcuate line described by the spot Pa during a scan and reflects the beam onto a concave mirror 21 on the other side of the polygon 17, via a planar mirror 22.

The concave mirror 21 may be of spherical or aspherical configuration and focusses the beam on the spot Pb via the facet B2 on the polygon 17. The width of the beam cone at the facet B2 is equal to the width of the facet as seen in the direction of rotation. A field mirror in the form of a concave mirror 23, which is suitably of cylindrical or spherical configuration, is positioned close to the locus travelled by the spot Pb during a scan and deflects the beam onto a further spherical or toroidal mirror 24 on the opposite side of the polygon 17. The mirror 24 focusses the beam onto the spot Pc via a reflection against the facet A2 on the polygon 17. The width of the beam cone at the location of this reflection, seen in the direction of rotation of the polygon, is substantially the same as the width of the facet A2. The beam is then reflected by a concave mirror 25 which is of spherical or aspherical configuration and which focusses the beam onto the remotely located object to be scanned. Consequently the beam is almost collimated. Placed in a common pupil during a scan is a further scanning means which effects a scan at right angles to the scanning means 17. As the illustrated embodiment this further scanning means has the form of a pivotal scanning mirror 26, although it may also have the form of a second polygon provided with reflecting mirrors. Temperature references T are suitably placed at one or both ends of the line travelled by the spot Pc during a scan.

Figure 5:
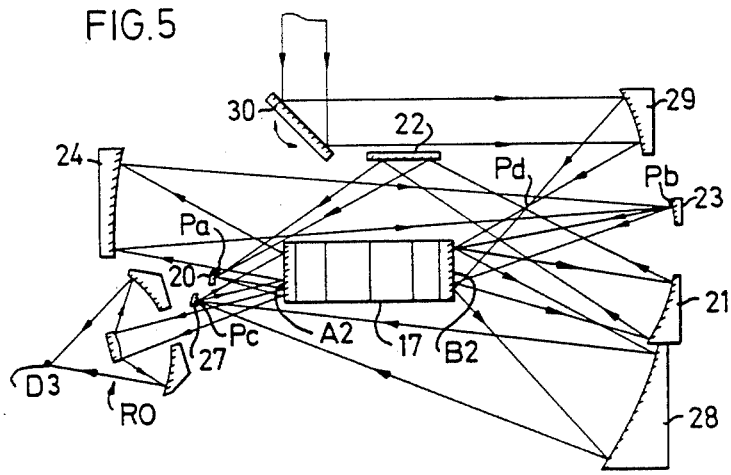
FIG. 5 is a sideview, partly in section, of a third embodiment of a device according to the invention.

The sole difference between the embodiment illustrated in FIG. 4 and that illustrated in FIG. 5 is that the beam path is moved against the polygon 17 for reflection therefrom a fourth time. Those components and elements coinciding with similar components and elements in FIG. 4 have therefore been allocated the same references. For the sake of illustration the beam path in this embodiment has been shown focussed exactly on the respective field mirrors 20,23,27, even though such focussing precision is not the case in practice. The beam path from the diode D3 to the facet A2 via the Cassegrain-type relay optic R0 is not diverted in this case, but in other respects is dimensioned in the same manner as with the elements D2 and 18 in FIG. 4. As with FIG. 4, the beam path of FIG. 5 then passes to the Pc via 20, 22,21,B2,23,24,A2. However located at the locus for Pc in FIG. 5 is a concave mirror 27, which is suitably spherical or cylindrical in shape. The mirror 27 deflects the beam path onto a further spherical or aspherical concave mirror 28 on the other side of the polygon 17, this mirror focussing the beam path onto Pd by reflection against the facet B2. The beam cone fills out the facet B2, at least in the direction of polygon rotation, and follows or tracks the facet B2 substantially exactly during a scan. The beam path is focussed onto the object to be scanned by a further mirror 29, which may be spherical or aspherical, the beam therefore being substantially collimated. When the scanning device according to the invention is arranged in a scan optic camera, such as an IR-camera, the vertical scan is effected by means of a pivotal scanning mirror 30. Temperature references are suitably placed at the ends of the curved path travelled by Pd (not shown).

EFFECT OF THE INVENTION

Figure 6:
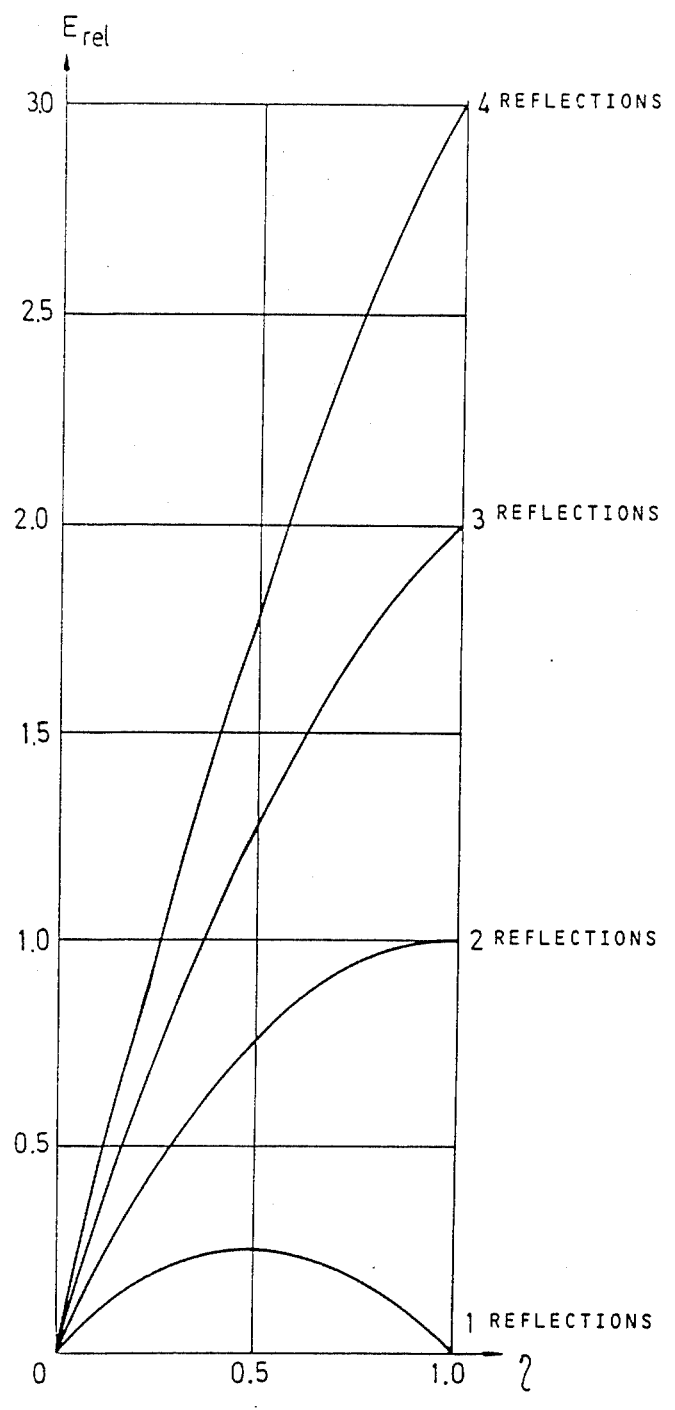
FIG. 6 is a diagram which illustrates the effect produced by the invention.

FIG. 6 illustrates the maximum performances achieved when reflecting the beam against the polygon once, twice, thrice and four times, the invention embracing the two latter cases. The scanning efficiency is given along the abscissa and the relative optical invariant $E_{rel}$ along the ordinate. As will be seen from this diagram, the highest relative optical invariant in the case of a single reflection is obtained when the scanning efficiency $\eta$ is 0.5. Consequently, in the case of solely one reflection it is fundamentally unsuitable for the efficiency of the system to deviate excessively from 0.5. In the case of two reflections where the beam tracks or follows a respective facet, the maximum relative optical invariant is, on the other hand, obtained at the next optimal scanning efficiency. However, as will be seen from the diagram, the attainable relative optical invariant increases by one unit for each further reflection against the polygon with full facet tracking, such that at the instance of four reflections, the maximum relative optical invariant attainable is already four times as large as that attainable with two reflections. For different reasons a scanning efficiency which is precisely equal to one (1) is not suitable, and hence a slightly lower efficiency is selected. As beforementioned the scanning efficiency is dependent upon the relationship between the respective widths of the beam cone and the facet at the location of the reflection nearest the detector, and it is not suitable to focus directly onto the facet since minor defects in the facet surface would then obtain an extremely important significance. It will be seen from FIG. 6, however, that an extremely good contribution to the relative optical invariant $E_{rel}$ is also obtained at low efficiencies.

Many variants are possible within the scope of the invention.

For example, in all embodiments the beam path has been shown to pass from one subject to be scanned. It will be understood that the reversed beam path through the system also falls within the scope of the invention, in which case the detector D1,D2 can be replaced with a modulated light source, such as a light diode or a laser, and the radiation recorded on a screen via the optical system. The invention also embraces the inclusion of two optical systems in which the beam paths have mutually opposite directions, and in which modulation of the light source is controlled by the signal from the detector. This latter forms part of the known technique and is described in the aforementioned Swedish Patent Application No. 8201306-1.

What I claim is:

1. An optical scanning device for effecting an optical scan over an area in at least one dimension, comprising:
   a rotatable polygon having a plurality of reflective facets uniformly disposed around the periphery thereof;
   a light-beam detector placed at the end of a beam path within the scanning device;
   stationary optical elements possessing beam deflecting properties placed relative to the rotatable polygon to pass and re-pass the beam path against the polygon such that the extension of the reflection onto a facet on the polygon positioned nearest to the detector is small in relation to the extension of the facet, the stationary optical elements being arranged to pass the beam path for reflection against the polygon at least three times, the stationary optical elements permitting the beam path for the reflection located nearest to the detector and each reflection against the polygon to substantially follow the movement of the polygon in the rotational direction of the polygon for effecting a substantially complete extension over each facet against which a reflection takes place, and the stationary optical element further effecting mutual reproductions between facets with reflections of substantially complete extension on diametrically opposed facets at a magnification of approximately $-1$.

2. A scanning device according to claim 1, wherein the polygon comprises first and second rows of reflecting facets, the first row including convex curved facets and the second row including planar facets, the reflection located nearest to the detector being imposed against a facet in the first row and the remaining reflections being imposed against mutually opposite facets in the second row.

3. A scanning device according to claim 1, wherein the polygon comprises a single row of planar.

4. A scanning device according to any one of the preceding claims, wherein the stationary optical elements between reflections against the polygon which substantially follow the polygon in its rotational movement comprise a curved field mirror and a concave mirror.

5. A scanning device according to claim 4, further comprising optical elements positioned between the reflection against the polygon occurring nearest to the detector and a succeeding reflection against the polygon, the optical elements including a curved field mirror and a concave mirror, and wherein all reflections against the polygon occur against alternate opposing facets on the polygon.

* * * * *